United States Patent
Cloutier et al.

(10) Patent No.: US 6,754,189 B1
(45) Date of Patent: *Jun. 22, 2004

(54) METHOD OF QUEUE LENGTH BASED BURST MANAGEMENT IN WIRELESS COMMUNICATION SYSTEMS

(75) Inventors: Joseph E. Cloutier, Cedar Knolls, NJ (US); Tejaskumar Patel, Lake Hiawatha, NJ (US); Wen-Yi Kuo, Parsippany, NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,368

(22) Filed: Apr. 8, 1999

(51) Int. Cl.[7] ............................................. H04B 7/204
(52) U.S. Cl. ........................ 370/329; 370/437; 370/468
(58) Field of Search ................................. 370/278, 282, 370/318, 319, 320, 329, 335, 342, 437, 441, 468, 477, 479

(56) References Cited

U.S. PATENT DOCUMENTS

| | | | | |
|---|---|---|---|---|
| 5,056,109 A | * | 10/1991 | Gilhousen et al. ............. | 375/1 |
| 5,790,551 A | * | 8/1998 | Chan ........................... | 370/458 |
| 5,793,744 A | | 8/1998 | Kanerva et al. | |
| 5,857,147 A | | 1/1999 | Gardner | |
| 5,859,838 A | * | 1/1999 | Soliman ...................... | 370/249 |
| 6,072,787 A | * | 6/2000 | Hamalainen et al. ........ | 370/335 |
| 6,088,335 A | * | 7/2000 | I et al. ........................ | 370/252 |
| 6,097,733 A | * | 8/2000 | Basu et al. .................. | 370/468 |
| 6,118,834 A | * | 9/2000 | Rasanen ...................... | 375/372 |
| 6,134,226 A | * | 10/2000 | Reed et al. .................. | 370/328 |
| 6,141,353 A | * | 10/2000 | Li ................................ | 370/465 |
| 6,219,343 B1 | * | 4/2001 | Honkasalo et al. .......... | 370/335 |
| 6,269,250 B1 | * | 7/2001 | Bender et al. ............... | 455/522 |
| 6,314,292 B1 | * | 11/2001 | Ho et al. ...................... | 455/450 |
| 6,330,462 B1 | * | 12/2001 | Chen ........................... | 455/572 |
| 6,378,069 B1 | * | 4/2002 | Sandler et al. .............. | 713/153 |
| 6,388,999 B1 | * | 5/2002 | Gorsuch et al. ............. | 370/335 |
| 6,389,000 B1 | * | 5/2002 | Jou ............................. | 370/342 |
| 6,526,030 B2 | * | 2/2003 | Rezaiifar et al. ........... | 370/335 |

FOREIGN PATENT DOCUMENTS

| | | |
|---|---|---|
| WO | WO97/36437 | 10/1997 |
| WO | WO98/59523 | 12/1998 |
| WO | WO99/63713 | 12/1999 |

OTHER PUBLICATIONS

Francis, M. J. et al "Rate Control for ABR Service in Wireless ATM Networks" Vehicular Technology Conference, vol. 3, May 18–21, 1998, pp. 1905–1909.*

Maryni, P. et al "Optimal Control for Dynamic Bandwidth Allocation in Communication Networks" Intelligent Control, Sep. 15–18, 1996, pp. 145–150.*

Bolla, R. et al "An Adaptive neural Network Admission Controller for Dynamic Bandwidth Allocation" Systems, Man and Cybernetics, vol. 28, Issue 4, Aug. 1998, pp. 592–601.*

* cited by examiner

Primary Examiner—Chi Pham
Assistant Examiner—Anh-Vu H Ly

(57) ABSTRACT

A method to dynamically assign data rates, for digital data transmission in wireless communication systems, which are just sufficient to meet the needs of the use is presented. The method monitors the data traffic and anticipates when the assigned data rate is inadequate to support the data traffic resulting in a loss of data or when the assigned data rate is more than necessary to support the data traffic and results in inefficient usage of system resources.

21 Claims, 3 Drawing Sheets

METHOD OF QUEUE LENGTH BASED BURST MANAGEMENT IN WIRELESS COMMUNICATION SYSTEMS

RELATED APPLICATIONS

The present invention is related to U.S. patent application Ser. No. 09/288,364, filed concurrently herewith, entitled INTELLIGENT BURST CONTROL FUNCTIONS FOR WIRELESS COMMUNICATION SYSTEMS, U.S. patent application Ser. No. 09/288,365, entitled METHOD FOR PREMATURE TERMINATION OF BURST TRANSMISSION IN WIRELESS COMMUNICATION SYSTEMS filed concurrently herewith, U.S. patent application Ser. No. 09/288,363, entitled SYSTEM AND METHOD FOR PREVENTION OF REVERSE JAMMING DUE TO LINK IMBALANCE IN WIRELESS COMMUNICATION SYSTEMS, filed concurrently herewith, U.S. patent application Ser. No. 09/288,587, entitled BURST DURATION ASSIGNMENT BASED ON FADING FLUCTUATION AND MOBILITY IN WIRELESS COMMUNICATION SYSTEMS, filed concurrently herewith, U.S. patent application Ser. No. 09/288,006, entitled A METHOD OF DYNAMICALLY ADJUSTING THE DURATION OF A BURST TRANSMISSION IN WIRELESS COMMUNICATION SYSTEMS, filed concurrently herewith, all of which are assigned to the same assignee and are incorporated by reference herein.

FIELD OF THE INVENTION

This invention relates to wireless communication systems and, more particularly, to monitor and dynamically assign signal data rates for data services in such systems.

BACKGROUND OF THE INVENTION

Wireless communication systems have been developed to allow transmission of information signals between an originating location and a destination location. Both analog (first generation) and digital (second generation) systems have been developed to transmit information signals over communication channels linking the source and destination locations. Digital methods tend to afford several advantages over analog systems. For example, improved immunity to channel noise and interference, increased capacity, and encryption for secure communications are advantages of digital systems over analog systems.

While first generation systems were primarily directed to voice communication, second generation systems support both voice and data applications. Numerous techniques are known in second-generation systems for handling data transmissions which have different transmission requirements. In particular, packet data transmission typically involves relatively short transmission duration whereas voice transmission is of a longer duration and requires continuous access to the communication channel. Several modulation/coding arrangements have been developed, such as frequency division multiple access (FDMA), time division multiple access (TDMA) and code division multiple access (CDMA), to increase the number of users that can access a wireless network. CDMA systems are more immune to multiple path distortion and co-channel interference than FDMA and TDMA systems and reduce the burden of frequency/channel planning that is common with FDMA and TDMA systems.

In a CDMA system, a unique binary code sequence is assigned to each active user within a cell to uniquely identify the user and spread the user's signal over a larger bandwidth. Multiplied by the assigned code, the user's signal is spread over the entire channel bandwidth, which is wider than the user's signal bandwidth. The ratio of the system channel bandwidth to the user's bandwidth is the "spreading gain" of the system. The capacity of the CDMA system is proportional to the "spreading gain" for a given signal-to-interference (S/I) level. After reception of the transmitted signal, the signal of each user is separated, or de-spread, from the signal of other users by using a correlator keyed to the code sequence of the desired signal.

First-generation analog and second-generation digital systems were designed to support voice communication with limited data communication capabilities. Third-generation wireless systems, using wide-band multiple access technologies such as CDMA, are expected to effectively handle a large variety of services, such as voice, video, data and imaging. Among the features which will be supported by third-generation systems is the transmission of high-speed data between a mobile terminal and a land-line network. As is known, high-speed data communications is often characterized by a short transmission "burst" at a high data transmission rate, followed by some longer period of little or no transmission activity from the data source. To accommodate the bursty nature of such high-speed data services in third-generation systems, it is necessary for the communications system to assign a large bandwidth segment (corresponding to the high data rate) for the duration of the data burst from time to time. With the ability of the third generation systems to handle such bursty high-speed data transmission, throughput and delay for users can be advantageously improved. However, because of the large amount of instantaneous bandwidth required for transmission of a burst of high-speed data, the management of such bursts, and particularly the allocation of power and system resources thereto, must be handled with care to avoid unwarranted interference with other services using the same frequency allocation.

In a wireless system accommodating the transmission of large blocks of data, the highest data rates would naturally be assigned to a bulk transmission user. As doubling the data rate would require only one-half the time to complete the transmission, assigning the highest data rate to such a user would minimize the time to transmit the user's data. However, as the number of users increases, and the information to be transmitted progresses from voice toward multimedia (real time video, and voice), the demands on the resources of the base station also increase. To insure that sufficient capacity exists to provide acceptable levels of service to the full user community, the communication systems must be capable of dynamically assigning system resources in an efficient and cost effective manner. U.S. Pat. No. 5,857,147, entitled, "Method and Apparatus for Determining the Transmission Data Rate in a Multi-User Communication System," to Gardner, et al., teaches of adjusting the data rates of a class of users in a muti-user signal environment such that the acceptable overall signal quality is maintained for the class of users.

As new users request entry onto the wireless network, a communication system base station must determine the resources necessary to accommodate the needs of the user and must allocate these resources to the user. Should sufficient resources be unavailable to accommodate the user, the base station must delay establishing a connection with the user and the user must wait until sufficient resources become available.

Among the resources the base station must allocate in establishing a communication link to a user are output power and data rate. Output power and data rate are proportionally related—the output power necessary to establish or maintain a link with a user increasing as the data rate increases. This increase in output power with increasing data rate is required to maintain the output energy per bit at a constant level. As base stations have limited output power resources, a base station must balance the transmission needs of its users, individually and collectively, against the base station's own output power limitations.

Thus, upon a request for entry to the wireless network by a user, the base station must evaluate the user's data rate and power demands against the current user environment and power demands. As the user environment approaches the total system capacity, the base station must delay the entry of a user onto the system to prevent overloading the output power capability of the base station. For example, a base station processing multiple users, each requiring high data rates, may be incapable of honoring a request for access by an additional low rate data user, because the base station lacks the power to meet the requirements of the additional low rate data user. This power deficiency may not be caused by the number of users in the system but rather by an excessive expenditure of power related to an inefficient allocation of data rates to the users. Assigning users with data rates significantly above that which is necessary to meet the users' immediate needs, wastes system resources, reduces the number of user capable of having concurrent access to the system, and increases the delay a user experiences in accessing the network. Thus, there is a need to efficiently manage and utilize the base station resources in order to provide users with a minimum data rate, and corresponding reduced power, that is just sufficient to meet their transmission needs.

SUMMARY OF THE INVENTION

It is an object of the invention to assign transmission data rates for a wireless system in an efficient manner by dynamic determination of the user's transmission needs during an active data session. It is a further object of the invention to dynamically adjust the transmission data rates by monitoring the transmission data buffers during an active data session. It is a further object of the invention to dynamically adjust and maintain assigned transmission data rates at a minimum necessary to fulfill the needs of the users.

The invention employs a fixed rate, low speed channel, which may be a control or signalling channel, to transmit user data up to the data rate of the channel and further operates to determine when a higher speed data link must be employed to meet the user's transmission requirements. In carrying out this function, the invention monitors the quantity of data within the transmit and receive data buffers during an active data session. Each buffer is monitored separately from the other and, also, separately or each active user served by that base station. When the quantity of data in the transmit or receive buffer exceeds predetermined threshold values, a higher speed data rate is established, using a supplemental data channel, to enable the base station to maintain the data buffers within prescribed threshold levels. Similarly, should the level of data in the data buffers fall below desired threshold levels, indicating the offered data rate is higher than is necessary for the user, a lower speed data rate is employed. Thus, each user is assigned the minimum data rate necessary to transmit data between the base station and the user at the remote site.

DETAILED DESCRIPTION OF THE INVENTION

The focus of early wireless systems, particularly first generation analog systems, was primarily voice communication. With second generation wireless systems, including CDMA, TDMA and GSM, came varying degrees of improvement in terms of voice quality, network capacity and enhanced services. However, while second generation systems are suitable to the provision of voice, low rate data, fax and messaging, they are generally not able to effectively and efficiently address requirements for high speed mobile data rates. The evolution to third generation wireless communications represents, essentially, a paradigm shift to the world of multimedia mobile communications, where users will have access not just to voice services but also to video, image, text, graphic and data communications. The third generation networks are expected to provide mobile users with data rates of between 144 Kbps and 2 Mbps.

Nonetheless, in wireless networks supporting these higher speed data communications applications, bandwidth and power control must be managed very carefully to avoid service denial due to improper allocation of bandwidth and power among such applications. As will be shown hereafter, the invention provides a novel methodology for improving power and bandwidth management in respect to such higher speed data applications, thereby providing improved operating efficiency and a reduced probability of service denial. Although the invention will be hereafter described in terms of a preferred embodiment based on CDMA encoding of the wireless signals, it should be apparent that the methodology of the invention can also be applied for other wireless channelization arrangements, including TDMA and GSM.

Figure 1:
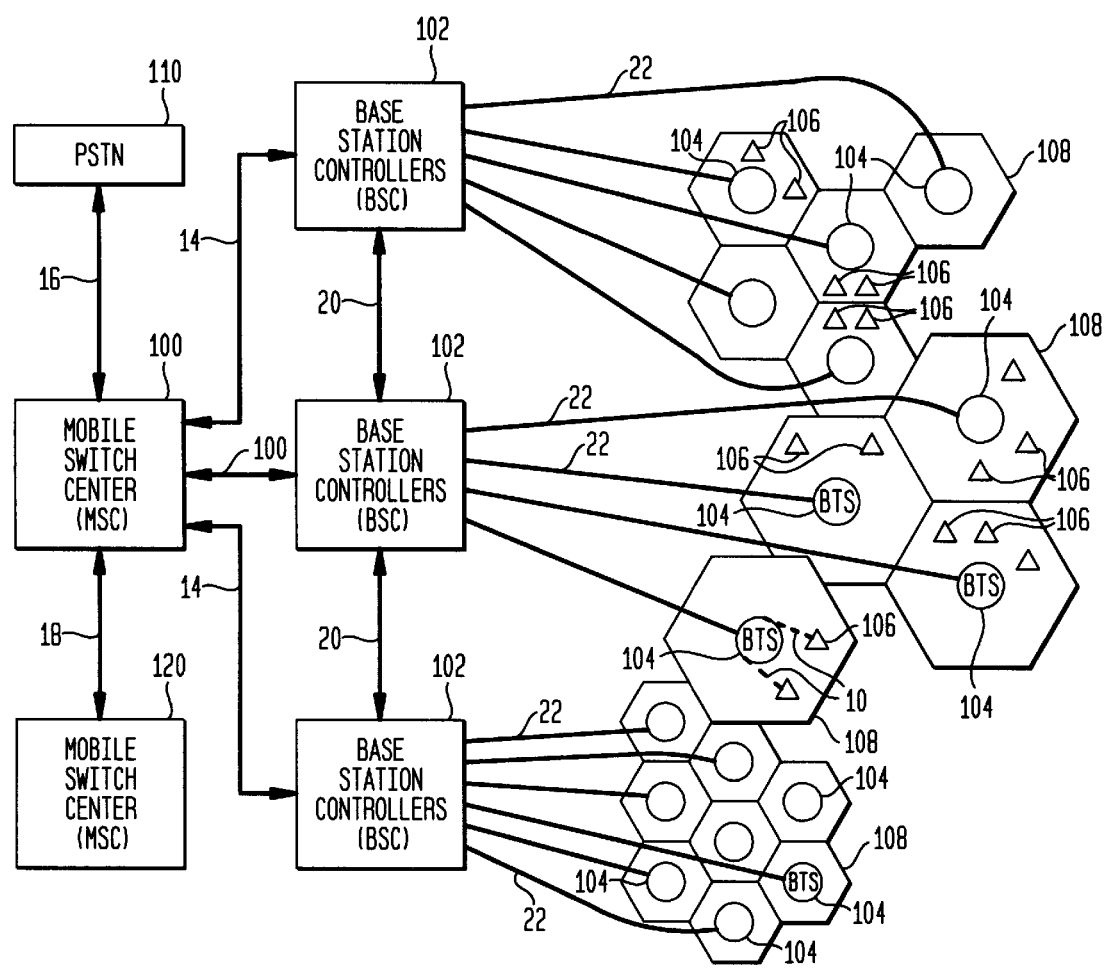
FIG. 1 illustrates a typical structure of a wireless communication system in which the methodology of the invention would be employed.

FIG. 1 illustrates typical wireless communications system configuration containing a Mobile Switch Center (MSC) 100, a plurality of Base Station Controllers (BSC) 102, a plurality of Base Transceiver Stations (BTS) 104 and multiple remote users, each operating a Mobile Station (MS) 106. In addition to providing management and control functions for sub-elements of the wireless network, the MSC 100 also provides an interface between the wireless network and the wireline network, PSTN, 110 or another wireless network, MSC, 120. The BSC 102 provides control and management functions for one or more BTSs 104. The BTS 104 consists of a set of, usually remotely tunable, transceivers placed at the wireless site, and is the termination point of the radio path on the network side. As illustrated in FIG. 1, each BTS 104 typically represents one cell 108 in the wireless network and is in radio communication with the remote users within the cell. The cell size can vary in the network depending on the user density expected in each cell. In densely populated regions, cells with an effective area of coverage in the order of hundreds of feet can be established, while in less populated regions, cell sizes can be significantly larger. This cell size also determines the power capabilities of the BTS 104 as larger cells require greater output power than smaller cells.

Mobile Stations, 106 such as cellular telephones, computer terminals or fax machines, terminate the radio path from the BTS 104 and provide access to the network services for the served users. The two way radio link between the BTS 104 and the MS 106 is, by convention, designated as the forward channel whenever the BTS 104 transmits to the mobile stations 106 and as the reverse channel whenever the MS 106 transmits to the BTS 104.

Figure 2:
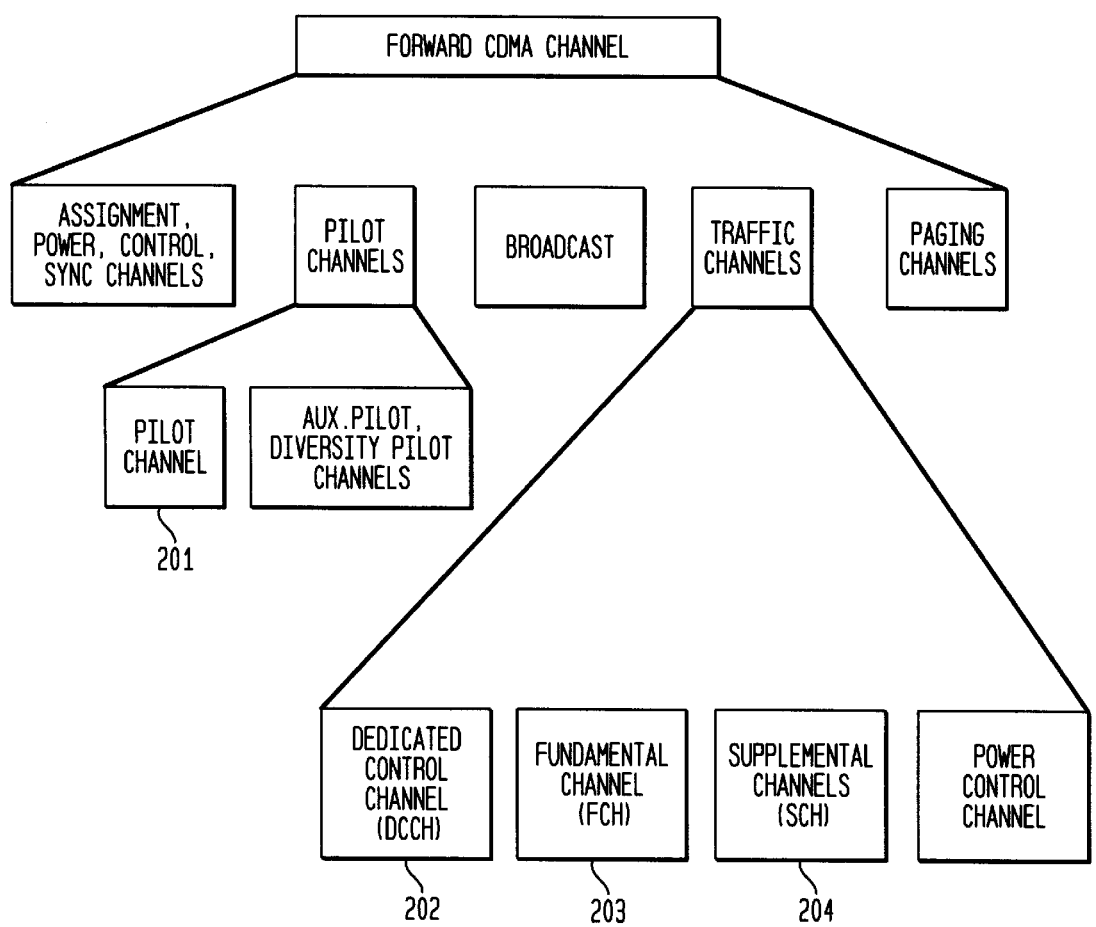
FIG. 2 illustrates the format of the forward channel in a wireless system in which the invention-would be employed.

FIG. 2 illustrates the CDMA forward channel multiplexing arrangement as established by the current version of the TLA/EIA/IS-2000.2 standard. A Pilot Channel (PCH) is indicated at 201 and operates to continuously transmit an unmodulated signal in a CDMA system. A PCH provides a phase reference for coherent modulation and a means for signal strength comparisons between BTS(s). A Dedicated Control Channel (DCCH) is indicated at 202 and used for the transmission of digital control information (including power control information) from a BTS to an MS. A Fundamental Channel (FCH) is shown at 203 that carries a combination of higher-level data and power control information. A Supplemental Channel (SCH) is indicated at 204 and will operate in conjunction with a DCCH and/or an FCH to provide higher data rate services (or burst data transfer) where higher-level data are transmitted.

Thus, the forward traffic channel, using this channel configuration, is adaptable to carry both voice and data traffic, even though voice and data have significantly different transmission requirements. Voice transmission, which is continuous and of relative long duration requires that there be no interruption of the transmission once transmission begins. Interruption in transmission renders the received data unacceptable to the receiver, since the reception, which is processed and evaluated as the data enters the receiver (i.e., real-time processing), is fragmented and disjoint.

Highly accurate vocal transmission can be achieved by converting the vocal fluctuations, into digital form, and transmitting the digitized voice pattern at 64 Kilobits per second (64 Kbps). Digitalization at higher rates than 64 Kbps have been found to provide no further improvement in the reconstructed voice pattern. Thus, the transmission rate for voice would not typically exceed 64 Kbps. Generally, transmission in the order of 8 Kbps provides acceptable voice performance and quality.

Data traffic, on the other hand, is typically manifested as a sequence of pulses which can be divided into, and transmitted in, packets, and the packets collected and reformatted at the receiver. Packets can be, and typically are, received out of sequence and any error or packet loss is compensated by the receiver in requesting retransmission of the error or dropped packet. Thus, data traffic does not impose upon the system, the necessity of uninterrupted transmission. Data traffic is further distinguished from voice transmissions as data traffic is communicated at significantly different data rates depending on the source and the transmission needs. For example, facsimile transmission, E-mail, and textual data can employ relatively low speed data rates—on the order of 9.6 Kbps, as the quantity of data involved can typically be transmitted in a reasonable time interval at the low data rate. However, graphics, such as images, or video transmissions require substantially higher data rates, to reduce to acceptable levels the time necessary to transmit the large quantity of digital data contained within the graphics or video images.

The method of the invention, considers the users' varying data transmission requirements and allocates the minimum data rate, and correspondingly the lowest output power, to meet the users' transmission needs. In accordance with the invention, when a link between the MS 106 and the BTS 104 is first established, the BTS 104 uses the low speed control channel to initialize the forward channel and reverse channel parametric data. Each active user in the system is allocated a forward and reverse channel, both channels being uniquely identified by the assigned code in a CDMA wireless system. The Dedicated Control Channel (DCCH) of the forward channel, as depicted in FIG. 2, is used as the control channel. However this channel can also be used to carry low speed informational data.

According to the method of the invention, the BTS 104, initializes the active data session with the user, using the DCCH, which will carry both control and information data. In another embodiment of the invention the BTS may assign the low speed Fundamental Channel for the informational data bits, while the DCCH is used for the control function.

As informational data is being transferred between the BTS and MS, the BTS monitors the data transmit and data receive buffers allocated for each specific user. The BTS gauges the input data rate supplying information to the transmit and receive buffers by measuring the quantity of data within each buffer and checks that the quantity of data remain within limits that are acceptable for both the transmission (forward channel) and the reception (reverse channel) of informational data. Should the transmission data rate be slower than the rate at which the user is supplying data to the BTS, the quantity of data within the buffer would increase above the acceptable limits. Without proper correction of this condition, the quantity of data would exceed the buffer size (overflow) and data would be lost.

The method of the invention gauging that the input data rate is too fast anticipates the potential of the overflow condition and causes the BTS to adapt the communication link to a higher data rate. The higher data rate may be a higher rate on the DCCH or the Fundamental Channel or one of the available rates of the Supplemental Channel. The Supplemental Channel of the forward channel, depicted in FIG. 2, is capable of transmitting information data at rates in excess of 1 Mbps. Similarly, if the transmission data rate is faster than the rate at which the user is supplying data to the BTS, the quantity of data within the buffer would decrease below the acceptable limits. In this condition, not only would the buffer eventually empty (underflow), but the higher data rate would cause the BTS to expend excessive output power to accommodate the high data rate. The invention, anticipating this underflow, would, in a manner similar to the response for when the data rate being too slow, cause the BTS to employ a lower data rate either on the DCCH, the Fundamental Channel or the Supplement Channel, as warranted, to accommodate the user's actual transmission requirements.

Similar to the operation of the invention on the forward channel, the reverse channel is monitored for an excessive or insufficient data rate condition. Here, the BTS monitors its receive buffers and gauges the input data rate. Should the BTS outprocessing of the receive buffers be slower than the input data rate, and the buffers are filling faster than acceptable, the invention would cause the BTS to signal the MS to slow the reverse channel data rate. Similarly, if the BTS outprocessing of the receive buffer is faster than the input data rate, the BTS would signal the MS to increase the data rate.

Figure 3:
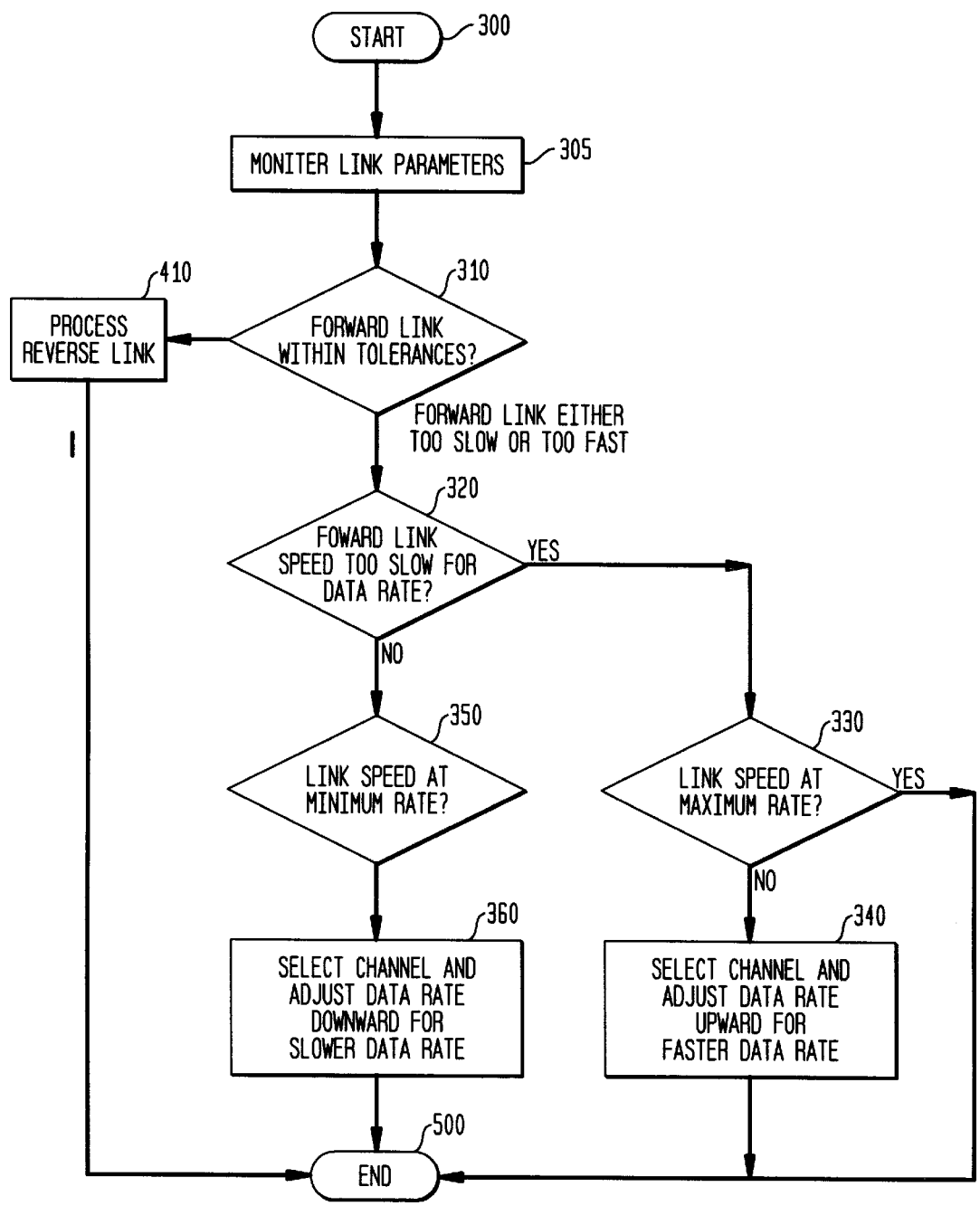
FIG. 3 illustrates a flowchart representing an embodiment of the invention.

Referring now to FIG. 3, a flowchart of one embodiment of the method of the invention is shown. A communication link is first established between a BTS (illustratively BTS 104 of FIG. 1) and an MS (illustratively MS 106 of FIG. 1) at block 300. This communication link can be initiated either by the MS requesting access to the network, or the BTS signalling the MS that the user is requested to be on the network. After the communication link is established, the BTS will initially establish the data transmission stream using either the low speed DCCH or the Fundamental Channel. During the active data session, the BTS monitors the data rate on the forward channel and on the reverse channel at block 305. The results of the monitoring function are then provided to a decision function at block 310. At block 310, the monitored forward link parametric values are compared to predetermined threshold values. Should the forward link monitor values be within the threshold values, the operation proceeds to reverse link processing at block 410, as the forward link is operating within acceptable limits and no adjustment is required of the forward link. Otherwise, the operation proceeds to block 320 as the forward link is not operating within acceptable limits and an adjustment of the data rate must be made.

At block 320, a comparison of the actual data rate to the channel data rate is made. If the channel data rate is too slow for the actual data rate, the operation proceeds to block 330 so that the channel data rate may be increased. Otherwise the operation proceeds to block 350 so that the channel data rate may be decreased.

At block 330 an examination of the current status of the data link is performed to verify that the link is not already operating at maximum capability. Should the link be operating at maximum rate, the operation proceeds to block 410 as it is not possible to increase the rate on the forward link any further. However, should the channel be able to accommodate an increase in the data rate the operation proceeds to block 340. At block 340, a higher data rate is selected and assigned, via the DCCH, the Fundamental or the Supplemental channel. Threshold levels commensurate with the higher data rate may be also assigned at this time.

At block 350 an examination of the current status of the data link is performed to verify that the link is not already operating at minimum capability. Should the link be operating at a minimum rate, the operation proceeds to block 410 as it is not possible to decrease the rate any further. However, should the link not be operating at the minimum rate and it is possible to further decrease the data rate, the operation proceeds to block 360.

At block 360, a lower data rate is selected and assigned, via an appropriate channel, the DCCH, the Fundamental or Supplemental Channel. Threshold levels commensurate with the lower data rate can be selected at this time.

At block 410, the invention is operable on the reverse link in a manner similar to that which has been explained in connection with forward link. If the data rate of the reverse link is too slow, the BTS instructs the MS to increase the data rate. If the data rate of the reverse link is too high, the BTS instructs the MS to decrease the data rate.

At the completion of the operation on the forward and reverse links, the operation proceeds to block 500 to cause the monitoring of the forward and reverse links to repeat for each active user in the network.

In second embodiment of the invention, the MS can perform a monitoring function with respect to the volume of data waiting for transmission from the MS to the BTS. On the occurrence of an anticipated buffer overflow or underflow condition, an informational signal would be sent from the MS to the BTS, from which the BTS would effect an adjustment of the data rate in the reverse link. In this embodiment, the MS may be provided with a threshold value, either a priori or dynamically, to be used by the MS buffer management function for determining when the underflow/overflow signal should be sent to the BTS. Similar to the forward link monitoring function, the threshold value would be commensurate with the data rate being used.

Thus the invention provides a novel method for dynamically adjusting the bandwidth/power level allocated for a given data service to the actual data rate required by that source.

CONCLUSION

The invention provides a novel means of dynamically adapting the communication channel data rate to provide the user with the minimum data rate that is both necessary and sufficient to fulfill the needs of the user. By assigning such a minimum data rate, the base station is able to expend less output power to maintain the communication link with each user, and with less power expended per user, the capacity to add users increases.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention and the exclusive use of all modifications which come within the scope of the appended claims is reserved

What is claimed:

1. In a wireless communication system having a base station and at least one mobile station, said base station operative to establish a communications link with at least one mobile station, said communication link having a plurality of channels, including a low speed channel operative to transmit control commands and traffic data, and one or more of said plurality of channels in combination defining ones of a plurality of data rate modes, a method for managing capacity allocation for a given user comprising the steps of:

a. causing a data communications stream transmitted via a forward channel of said communications link to be initiated via said low speed channel;

b. gauging a rate of data transmission over said communications link for said given user based on a measure of data in a transmit data buffer for said forward channel;

c. for said given user, selecting a data rate mode from said plurality of data rate modes, said selected data rate mode providing sufficient capacity to support said gauged communications link data rate:

d. monitoring a receive data buffer associated with a reverse channel for said given user in respect to a degree of fill for said receive buffer; and e. providing a signal to a mobile station of said given user indicative of a reverse channel data rate to be used by said mobile station, said reverse channel data rate being determined as a function of the degree of fill for said receive data buffer.

2. The method of managing capacity allocation as recited in claim 1, wherein steps b and c are iteratively repeated for said given user to dynamically adjust said at least one channel and said selected data rate based on changes in said data buffer measure.

3. The method of managing capacity allocation as recited in claim 1, wherein steps a, b, c, d and e are iteratively repeated among substantially all of said mobile stations within said system.

4. The method of managing capacity allocation as recited in claim 1, wherein said forward channel includes a control channel and a traffic channel, said control channel being operative to transmit control commands and traffic data.

5. The method as recited in claim 4, wherein said forward link channel is chosen to have capacity sufficient to support said selected data rate.

6. The method of managing capacity allocation as recited in claim 1, wherein said receive data buffer operates to receive data over said reverse channel.

7. The method of managing capacity allocation as recited in claim 6, wherein said degree of fill for said receive data buffer is determined in respect to known threshold limits.

8. The method of managing capacity allocation as recited in claim 7, wherein said threshold limits include a plurality of pre-determined threshold values commensurate with said plurality of data rate modes.

9. The method of managing capacity allocation as recited in claim 1, wherein said transmit data buffer operates to receive data for transmission over said forward channel.

10. The method of managing capacity allocation as recited in claim 9, wherein said measure of data in said transmit data buffer is determined in respect to known threshold limits.

11. The method of managing capacity allocation as recited in claim 10, wherein said threshold limits include a plurality of pre-determined threshold values commensurate with said plurality of data rate modes.

12. The method of managing capacity allocation rate as recited in claim 1 wherein the communication links are established in respect to a code division multiple access (CDMA) system.

13. A method of adaptively allocating channel capacity in a wireless communication system, said wireless communication system being characterized by at least one base station and at least one mobile station, said mobile station being in communication with said base station through a communications link, wherein said communications link includes a control channel and one or more traffic channels, the method comprising the steps of:

a. initiating a data communications stream on a forward channel between said at least one base station and one of said at least one mobile stations on said control channel, wherein said control channel is operative to transmit control commands and traffic data;

b. measuring a rate of data being received in a transmit data buffer from a source of said data communications stream for said forward channel;

c. selecting a data rate sufficient to support said forward-channel measured rate of data from a plurality of data rates corresponding to particular combinations of said control channel and said one or more traffic channels;

d. allocating capacity in said forward channel of said communications link corresponding to said selected data rate;

e. monitoring a receive data buffer associated with a reverse channel for said communications link in respect to a degree of fill for said receive buffer; and f. providing a signal to a mobile station for said communications link indicative of a reverse channel data rate to be used by said mobile station, said reverse channel data rate being determined as a function of the degree of fill for said receive data buffer.

14. The method of allocating-channel capacity as recited in claim 13, wherein steps a through d are iteratively repeated for said one of said at least one mobile stations, said selected data rate being thereby dynamically adjusted based on changes in said data buffer measure.

15. The method of allocating channel capacity as recited in claim 13, wherein steps a through f are iteratively repeated among substantially all of said at least one mobile stations in said system.

16. The method of allocating channel capacity as recited in claim 13, wherein said receive data buffer operates to receive data over said reverse channel.

17. The method of allocating channel capacity as recited in claim 16, wherein said degree of fill for said receive data buffer is determined in respect to known threshold limits.

18. The method of allocating channel capacity as recited in claim 17 wherein said threshold limits include a plurality of known threshold values commensurate with said plurality of data rates.

19. The method of allocating channel capacity as recited in claim 13, wherein said transmit data buffer operates to receive data for transmission over said forward channel.

20. The method of allocating channel capacity as recited in claim 19, wherein said measure of data in said transmit data buffer is determined in respect to known threshold limits.

21. The method of allocating channel capacity as recited in claim 20, wherein said threshold limits include a plurality of known threshold values commensurate with said plurality of data rates.

* * * * *